Feb. 17, 1942.  A. L. LAMBERT  2,273,208
TREAD STRUCTURE
Filed Jan. 16, 1939
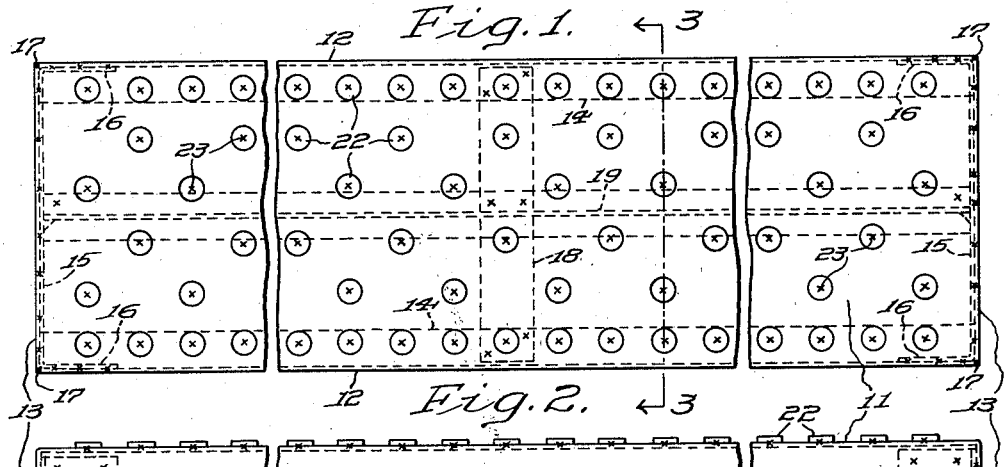
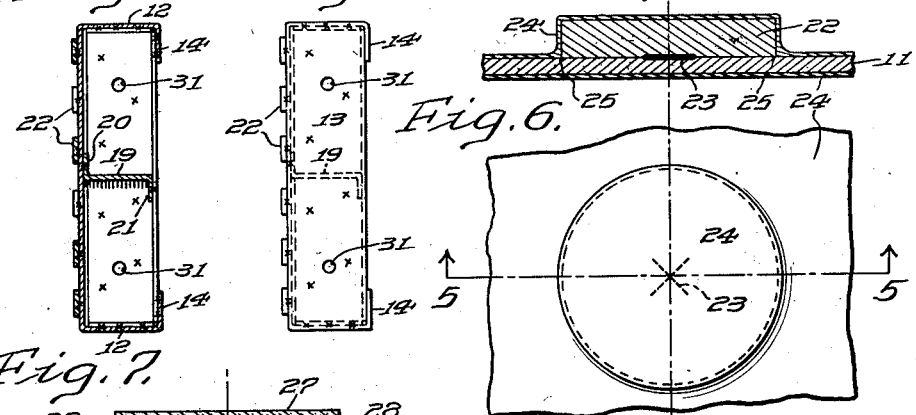
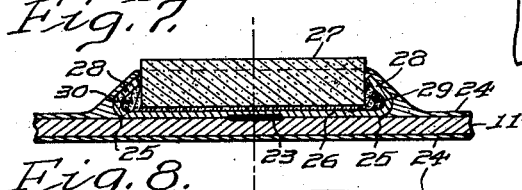
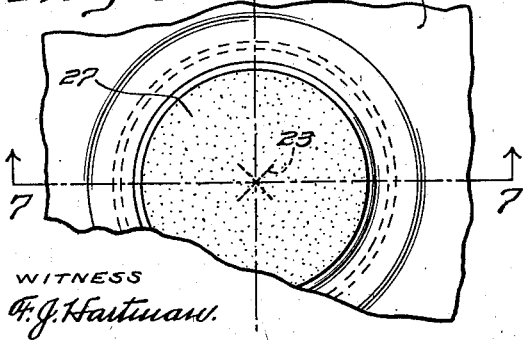
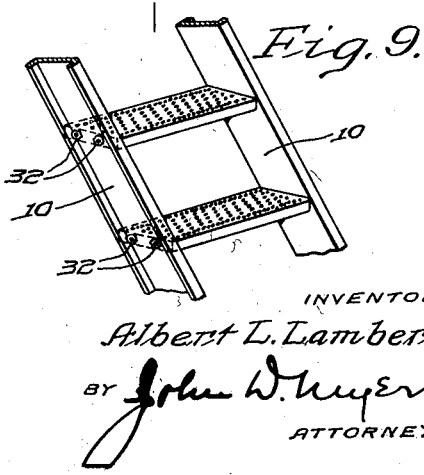
INVENTOR
Albert L. Lambert.
BY John W. Myers
ATTORNEY
WITNESS
F. J. Hartman.

Patented Feb. 17, 1942

2,273,208

UNITED STATES PATENT OFFICE 2,273,208

TREAD STRUCTURE

Albert L. Lambert, Narberth, Pa., assignor to Heintz Manufacturing Company, a corporation of Pennsylvania Application January 16, 1939, Serial No. 251,197

5 Claims. (Cl. 228—58)

The invention relates to a tread structure and the method of making the same, and involves an improvement in tread plates of the type which is provided with non-slip or wear elements projecting from the tread surface, and which is employed with ship ladders and the like.

In the manufacture of metal treads for ladders, stairs and other structures where a non-slip wear surface is desired, it has been common practice heretofore to form the tread plate of ordinary, low grade sheet steel, and to provide non-slip projections on the wear surface by suitably indenting the opposite side of the plate. Tread structures have also been made by securing non-slip elements of ordinary, low grade steel to a tread plate made of similar material. Tread structures formed from rust-proof or other corrosion-resisting metal are also known, and in some types of such structures non-slip elements made of corrosion-resisting metal have been secured to the wear surface of a tread plate made of similar material.

A tread plate made of low grade sheet steel is objectionable when used under certain conditions, such as on shipboard, by reason of the fact that the low grade steel is not sufficiently resistant to the corrosive action of salt air and various fumes and liquids to which the tread is subjected. Tread structures made wholly of corrosion-resisting metal are expensive as compared to a similar structure made of ordinary, low grade steel. Where a safety tread is formed by securing non-slip elements to a tread plate, it is difficult in the course of ordinary manufacture to provide a tight joint between the non-slip elements and the surface of the tread plate. The non-slip elements are usually secured to the tread plate by a spot welding operation centrally of the non-slip elements, and, due to irregularities in the adjacent surfaces of the non-slip elements and the tread plate, the joints are not sufficiently tight to prevent the entrance of dirt and other foreign matter between the non-slip elements and the tread plate. The character of the joints formed in this manner is such that it is practically impossible to remove this accumulation of foreign matter by the ordinary scrubbing or cleaning operations.

One of the principal objects of the present invention is the provision of a tread structure which is comparatively inexpensive, yet will withstand the excessive wear to which it is subjected.

A further object of the invention is the provision of a tread structure which is practically free from corrosion throughout its life, notwithstanding the wear to which certain parts thereof, such as the non-slip elements, are subjected.

A still further object of the invention is the provision, in a tread structure having non-slip elements secured thereon, of an effective seal against the entrance of dirt and corrosive liquids and gases into the joints between the non-slip elements and the tread plate.

Still further objects and advantages of the invention will be apparent from the following description, taken with the accompanying drawing wherein:

Fig. 1 is a plan view, partly broken away, of a tread structure with my improvements incorporated therein;

Fig. 2 is a side elevational view, partly broken away, of the tread structure shown in Fig. 1;

Fig. 3 is a transverse sectional view taken on the line 3—3 of Fig. 1;

Fig. 4 is an end elevational view of the tread structure shown in Figs. 1 and 2;

Fig. 5 is a transverse sectional view through one of the non-slip elements and a portion of the tread plate to which it is secured;

Fig. 6 is a plan view of one of the non-slip elements and a portion of the tread plate;

Fig. 7 is a transverse sectional view similar to Fig. 5, but showing a modified form of non-slip element;

Fig. 8 is a plan view of the modification shown in Fig. 7; and

Fig. 9 is a perspective view of a section of a ship's ladder showing the manner in which my improved tread structure is utilized therewith.

As I have illustrated the same in the drawing, my improvement is utilized in the form of a tread structure for a ship's ladder provided with side pieces 10 formed from steel strips having reinforced edges formed by bending them into any desired shape, such as shown in Fig. 9. The tread element is in the form of a box-like structure the upper wall of which is substantially rectangular and forms a tread plate 11 having side walls 12 and end walls 13 depending therefrom. This box-like structure is preferably formed from a single piece of low grade sheet steel. The walls 12 are formed by bending the side edges of the sheet into positions at right angles to the main portion which forms the tread plate 11. The free edges of the side walls 12 are then bent inwardly toward each other to form reinforcing and supporting flanges 14. The end portions of the sheet are bent downwardly to form the end walls 13 of the box-like structure.

A reinforcing strip 15, likewise made of low grade sheet steel, has its ends bent at right angles as shown at 16, and is positioned on the inside of each end wall 13 and spot welded thereto, the angularly bent ends 16 being spot welded to the side walls 12. Preferably the line of junction of the side walls 12 and the end walls 13 at the corners of the structure are welded as indicated at 17. A narrow supporting bar 18 made of ordinary sheet steel is arranged transversely of the structure with its ends supported upon and welded to the inturned flanges 14. A reinforcing bar 19 of Z-shape in cross section is arranged lengthwise of the structure with its upper flange 20 in engagement with and welded to the tread plate 11 and its lower flange 21 in engagement with and welded to the supporting bar 18. The end edges of the reinforcing bar 19 are preferably welded to the end reinforcing strips 15.

In order to provide the plate 11 with a safety tread, a plurality of non-slip elements 22 in the form of discs of corrosion-resisting metal are spot welded or otherwise secured to the outer surface thereof as indicated at 23. The non-slip elements 22 are preferably arranged in rows along the opposite side edges of the tread plate 11, with the non-slip elements between these outer rows arranged in such manner as may be desired. Preferably the non-slip elements in the outer rows are arranged closer together than the remaining non-slip elements so that the shoes of those using the tread will not flex downwardly between the elements, thereby minimizing the likelihood of tripping. The wider spacing of the intermediate elements permits the shoes of the users to bend downwardly between them and thus give a better non-slip contact with the tread structure.

The box-like structure, with the non-slip elements 22 thus welded on the tread surface, is then provided with a corrosion-resisting, metallic coating 24 for the purpose of covering all exposed portions of the low grade steel which is utilized, and sealing the joints 25 between the non-slip elements 22 and the tread plate 11. The entire tread structure is preferably coated by dipping it in molten zinc, this procedure being a well-known commercial galvanizing operation. By this method of coating the tread structure, all exposed surfaces of the steel forming the box-like structure, as well as the exposed surfaces of the non-slip elements 22, are provided with a corrosion-resisting coating, and the joints 25 between the non-slip elements and the tread plate 11 are effectively sealed by the coating against the entrance of dirt and corrosive liquids and gases. It will be understood, of course, that it is not essential to provide a coating of corrosion-resisting material for the exposed portions of the non-slip elements 22, but it is easier and more economical in manufacture to apply the coating to all exposed surfaces on the assembled tread structure.

In the modification of the invention illustrated in Figs. 7 and 8 of the drawings, the non-slip elements are in the form of socket members 26 welded to the outer surface of the tread plate 11 as shown at 23, and having a disc 27 of abrasive material, such as emery, secured therein. The socket members 26 are formed from corrosion-resisting metal by a punching operation, and are so shaped as to provide side walls 28 inclined inwardly to form a marginal space 29 for the cement 30 utilized for securing the abrasive elements 27 in position.

In the manufacture of the modified form of tread shown in Figs. 7 and 8, the socket members 26 are preferably provided with temporary fillers before the assembled box-like structure, with the socket members welded thereon, is subjected to the galvanizing operation. After the galvanizing operation the temporary fillers are removed and the abrasive elements 27 are secured in the socket members by means of a suitable cement as indicated at 30. The peripheral channel 29 at the bottom of the socket members fills with the cement 30 and assists in anchoring the abrasive discs 27 in position.

As illustrated in Fig. 7 of the drawing, the coating of corrosion-resisting metal 24 covers the exposed surfaces of the tread plate 11 and the socket members 26, and thoroughly seals the joints 25 between the socket members and the tread plate. It will be apparent, however, that it is unnecessary to apply the corrosion-resisting coating to the side walls 28 of the socket members, the object being to thoroughly protect all exposed parts of the low grade steel box-like structure and to seal the joints between the socket members and the tread plate.

The end walls of the tread structure are preferably provided with suitable openings 31 through which bolts 32 may be passed for securing the tread to the side pieces 10 of the ladder as illustrated in Fig. 9. It will be understood, however, that a tread made in the manner herein disclosed is susceptible of uses other than those specifically described and illustrated herein.

As will be apparent from the above description, the present invention may be manufactured very economically by reason of the use of low grade steel throughout the body portion of the tread structure. Notwithstanding this use of low grade, corrodible steel, all exposed portions of corrodible metal are covered by a metallic protective coating. The parts of the structure which are subject to wear when the tread is in use are made of corrosive-resistant metal, and for this reason any wearing away of the non-slip elements after continued use does not expose corrodible parts of the structure. As will also be apparent from the above description, the joints between the non-slip elements and the tread plate are thoroughly sealed by the corrosive-resistant coating to thus prevent the entrance of corrosive liquids and vapors and other foreign matter between the non-slip elements and the tread plate.

While certain structural forms of the invention have been disclosed herein, together with the preferred method of manufacturing the same, it is to be understood that the invention is not intended to be limited to the precise structure and method disclosed. The above description and the accompanying drawing are therefore to be regarded as illustrative only, and it is to be understood that the invention is susceptible of other forms and arrangements so long as they come within the scope of the appended claims.

What is claimed is:

1. A ladder tread comprising a corrodible sheet steel supporting plate, a plurality of corrosion-resisting socket members secured on one side of said plate in spaced relation to each other, an abrasive non-slip element secured in each of said socket members, and a corrosion-resisting metallic coating covering the exposed surfaces of said plate and said socket members.

2. A ladder tread comprising a corrodible sheet steel supporting plate, a plurality of corrosion-resisting socket members welded on one side of said plate in spaced relation to each other, an abrasive non-slip element secured in each of said socket members, and a coating of corrosion-resisting metal covering the exposed surface of said plate and sealing the joints between said socket members and said plate.

3. A ladder tread comprising a rectangular supporting plate having depending flanges on its side and end edges with the free edges of the side flanges turned inwardly toward each other, a transverse supporting bar intermediate the ends of said plate and having its opposite ends secured on the inwardly turned edges of said side flanges, and a longitudinal reinforcing bar having its opposite ends secured to the end flanges, with one edge in engagement with said supporting bar and its opposite edge in engagement with said plate.

4. A ladder tread comprising a box-like structure formed of corrodible sheet steel and consisting of a rectangular supporting plate having depending flanges on its side and end edges with the free edges of the side flanges turned inwardly toward each other, a transverse supporting bar intermediate the ends of said plate and having its opposite ends secured on the inwardly turned edges of said side flanges, and a longitudinal reinforcing bar having its opposite ends secured to the end flanges, with one edge in engagement with said supporting bar and its opposite edge in engagement with said plate, a plurality of corrosion-resisting non-slip elements secured to the outer surface of said plate in spaced relation to each other, and a corrosion-resisting metallic coating covering the exposed surfaces of said box-like structure and sealing the joints between said non-slip elements and said plate.

5. The method of making a tread member which comprises forming a substantially rectangular supporting plate from a sheet of corrodible steel, welding a plurality of corrosion-resisting metal socket members on one side of said plate in spaced relation to each other, galvanizing the exposed surface of said plate, and securing an abrasive non-slip element in each of said socket members.

ALBERT L. LAMBERT.